Figure 1:
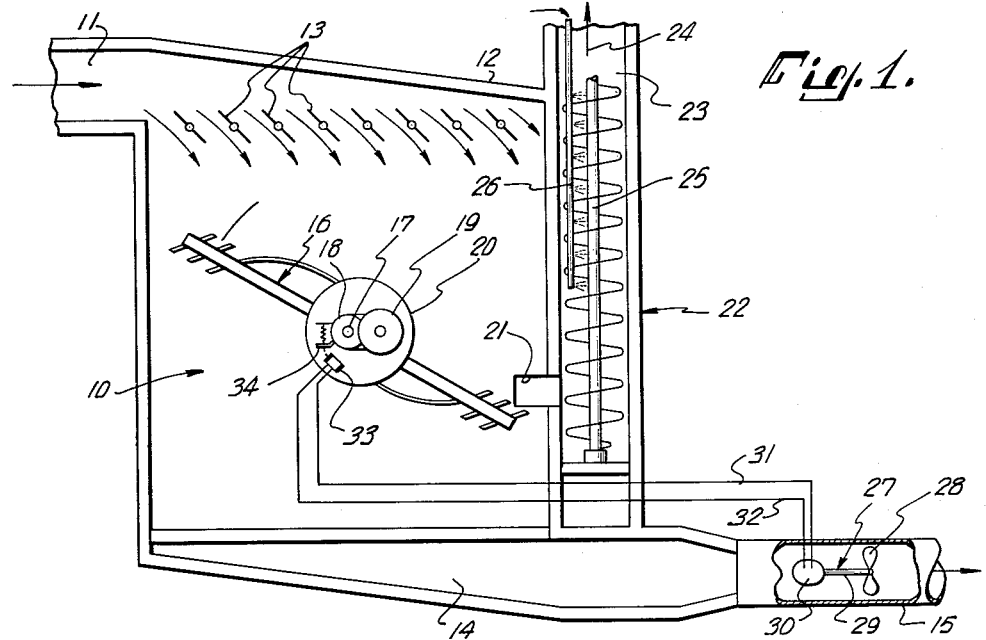

INVENTOR.
JOSEPH L. FEENEY

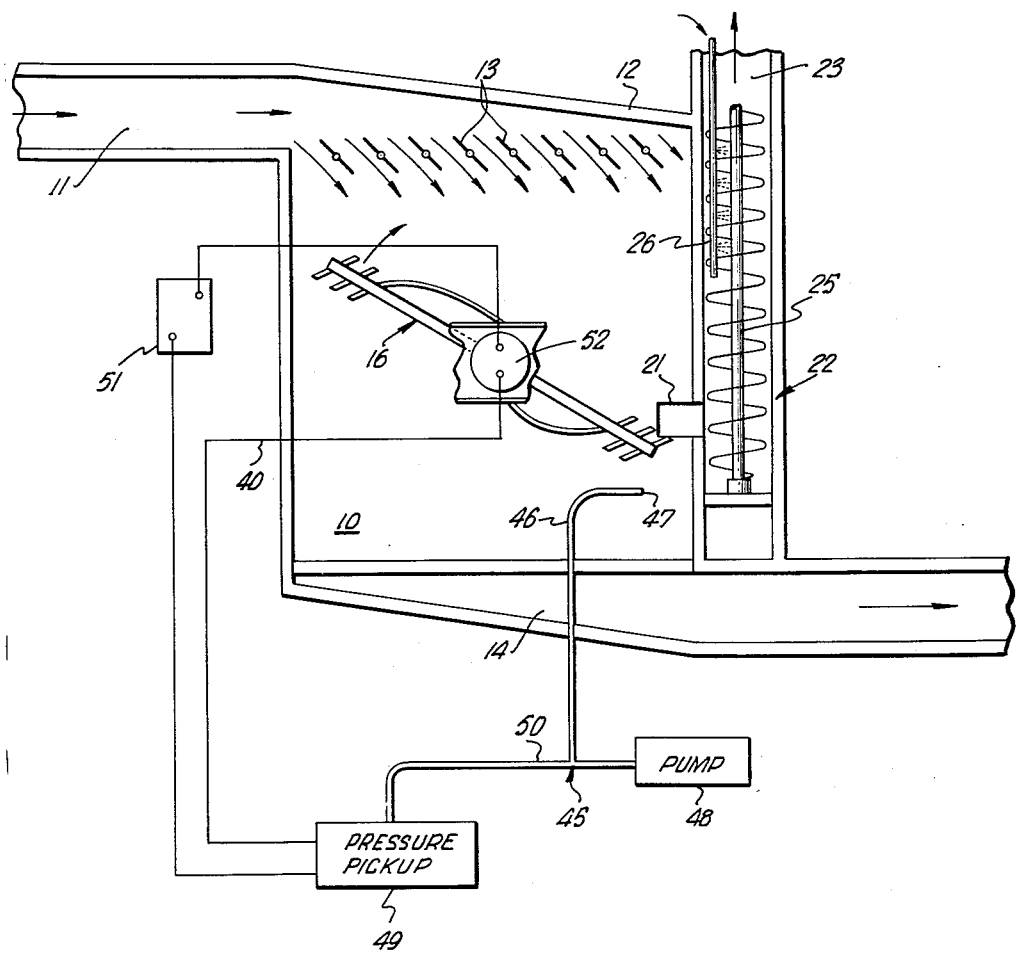

United States Patent Office 2,987,185
Patented June 6, 1961

2,987,185
REMOVAL OF GRIT FROM SEWAGE
Joseph L. Feeney, Belmont, Calif., assignor to Process Engineers, Inc., San Mateo, Calif., a corporation of Nevada
Filed June 10, 1957, Ser. No. 664,810
5 Claims. (Cl. 210—97)

This invention is concerned with removal of grit from sewage in a continuous operation and provides improvements in methods and apparatus for this purpose. More particularly, the invention contemplates improvements in the removal of grit from sewage streams which also contain suspended organic matter and which flow at markedly varying rates, to the end that the grit is removed in a relatively clean condition, without large proportions of entrained organic matter, and with minimum washing.

Most sewage contains grit in addition to dissolved and suspended organic matter. The grit is granular, relatively heavy, and largely inorganic. If this grit is permitted to enter a sewage treatment plant, it causes severe abrasions of pumps, valves, raking mechanisms, etc. Moreover, unless the grit is removed, it ultimately enters digesters where, due its inorganic nature, it reduces volumetric efficiency of the digesters. Sand and other inorganic matter coarser than 65 mesh and having a specific gravity of 2.65 or more causes the most trouble and most modern sewage plants aim to remove grit of this coarseness or even finer prior to treatment of the organic content of the sewage. In an effort to bring this about the raw sewage from the mains is run through preliminary settling or "degritting" apparatus before it is run into the treatment plant proper.

The degritting apparatus usually comprises a settlement chamber of such size that the velocity of the sewage stream at average flow is reduced in the chamber to the point where the grit settles. If the settlement chamber is designed for proper velocities at maximum flow, organic matter tends to settle with the grit at flows that are lower than the maximum. This causes difficulties.

The settlement chamber is provided with raking means which moves the settled grit across its bottom to a discharge port or conduit, through which it drops into a classifier or washer. This may be an inclined trough provided with a rake or screw conveyor that moves the grit upward in the trough to discharge and at the same time agitates it to free it from organic solids. Sometimes water sprays are placed in the classifier portion of the apparatus to assist in the separation of organic matter from the inorganic grit.

As long as the flow of sewage through a conventional settlement basin is average, apparatus of the type just described works pretty well. Unfortunately, this average flow only occurs for a short time, certainly not more than a few hours out of each day. Municipal sewage flows frequently range from a noontime peak to an early morning minimum which is a third or less of the peak. When the flow rate exceeds the average, not all of the grit is settled. When the sewage flow is diminished below the average the settlement capacity of the chamber is more than ample for the grit alone, and a large proportion of organic solids settles along with the grit and is raked to the classifier. Then, despite washing, a considerable proportion of the organic matter accompanies the grit to discharge. The organic matter in the grit decays and causes severe odor nuisance in the classifier.

As a result of my investigations I have discovered that the rakes in the settlement chamber can be employed to perform a dual function. Thus they may be used, as previously, to move the grit out of the settlement basin, and simultaneously, to prevent organic solids from settling along with the grit during periods of low sewage flow. At periods of low flow, the velocity of the sewage in the settlement chamber naturally drops and the residence time of the sewage in the chamber increases. Both of these factors are favorable to the settlement of organic solids, but in accordance with my invention both are counteracted by increased agitation in the chamber. The increased agitation is obtained by increasing the speed of the rakes. At the higher speed, the rakes continue to function efficiently insofar as the movement of grit is concerned while they become less efficient in moving the less granular and lighter organic matter. At the same time, the rakes, or at least the upper portions of the rakes, cause sufficient agitation to prevent any increase in the settlement of organic solids during periods of low sewage flow.

In the preferred practice of my invention, I provide a settlement basin designed to handle maximum rather than average flow, in other words a settlement basin so large that all grit will settle out in it even when the full flow of sewage passes through it. I then meter the sewage flow through the settlement basin and automatically increase the raking speed as the flow rate decreases and vice versa, correlating raking speed inversely to flow rate in such fashion that the amount of organic solids removed in the operation along with the grit remains at a low value and substantially constant. In this fashion odor nuisance is eliminated, wash water consumption is reduced or eliminated, and a cleaner grit is obtained.

The sewage flow may be determined or measured either ahead, behind, or in the settlement basin, depending largely upon convenience of location. By way of example, a float may be placed in a well, in a weir or Parschall flume through which the main sewage stream is flowed to degritting. The float is connected by appropriate linkage to an electrical device, such as a rheostat, which varies the speed of a motor driving the rakes inversely to the sewage flow rate. In a second control system, a venturi-type meter is placed in a conduit which receives the main sewage flow from the degritting operation, the response of the meter being employed to control the rake drive so that rake speed is increased as flow diminishes to counteract, more or less exactly, the increased tendency of the organic solids to settle under the conditions of the particular diminished flow. In a third system, a dip tube is placed in the settlement basin itself, where the liquid level increases as flow increases and vice versa. The dip tube senses the liquid level in the basin and through a pneumatic linkage automatically increases rake speed as flow diminishes and vice versa.

It is possible to install in the settlement compartment of the degritter a separate agitator which functions independently of the raking means and to regulate the speed of this agitation inversely to the sewage flow rate. This is within the scope of my invention, but is less desirable since it requires additional equipment and may consume more power. Moreover, it is less satisfactory in that, as pointed out previously, speeding up the raking means does not affect appreciably the efficiency of grit movement along the bottom of the settlement basin but does reduce the efficiency with which organic solids are raked, so that these tend to be left behind. This advantage does not accrue to independent agitating means placed in the pool above the rakes.

These and other aspects of my invention will be understood thoroughly in the light of the following detailed description of presently preferred practice and apparatus.

Figure 2:
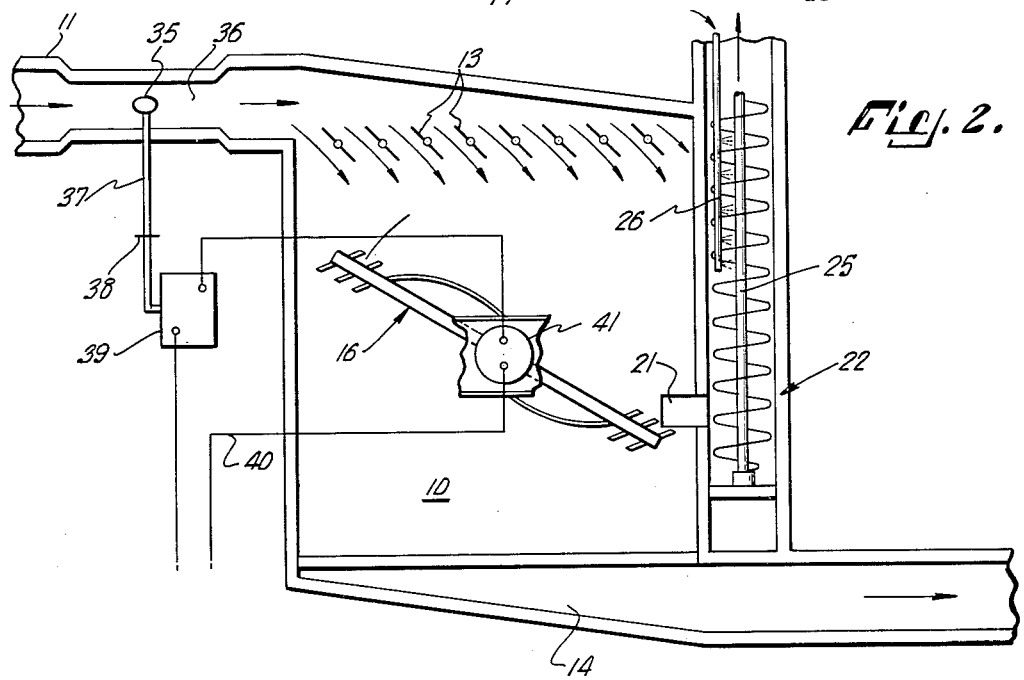

The description is illustrated by the accompanying drawings, in which:

FIG. 1 is a flow sheet or diagram of one presently preferred form of my apparatus and illustrates schematically the use of a flow measuring device on the outflow of a settling chamber to change the setting of a variable speed reducer so that the speed of raking means in the settling chamber increases automatically in response to reduction in flow rate of the sewage stream and vice versa;

FIG. 2 illustrates a modification of the apparatus of FIG. 1 in which a float in a weir in an inlet to a degritting chamber is employed to adjust a rheostat connected in circuit with a variable speed motor, to the end that the speed of raking means in the chamber is increased as flow rate is reduced and vice versa; and FIG. 3 illustrates a second modification of the apparatus of FIG. 1, in which a third form of sensing means is employed for control of rake speed, this sensing means being disposed in the settlement basin proper.

The apparatus of FIG. 1 comprises a settlement chamber 10 that is approximately square in plan and enclosed by upright walls. An inflow conduit or launder 11 that tapers toward its far end 12 admits a stream of sewage to be degritted into one end of the settlement chamber through a set of adjustable baffles 13 that are set so that the fluid flow across the settlement chamber (downward as viewed in FIG. 1) tends to be uniform. An outflow conduit 14 is attached to the settlement chamber opposite the inflow conduit and widens in the direction of flow, inflow and outflow conduits being substantially parallel to each other and at right angles to the direction of liquid flow through the chamber. The outflow conduit discharges into a pipe 15 which conveys the degritted sewage to a conventional sewage treatment plant, not shown. A rake 16 is disposed in the bottom of the settlement tank and extends across it, being fastened to a vertical shaft 17 attached at its upper end to a conventional variable speed reducer 18 which in turn is driven by a constant speed motor 19, the motor and speed reducer being mounted on a base plate 20. The motor, through the speed reducer, turns the raking means (clockwise as viewed in FIG. 1) moving grit that settles to the bottom of the chamber in an expanding spiral to a grit sump 21 in the bottom of the chamber. This grit sump feeds by gravity into the lower end of a spiral classifier 22 having a trough 23 that slopes upward in the direction of the arrow 24. A screw conveyor 25 is mounted longitudinally in the trough and is turned by conventional means, not shown. The screw conveyor moves grit upward in the trough of the classifier to discharge.

When a stream of sewage flows through the degritter of FIG. 1, a pool of sewage is held in the settlement chamber and also in the lower portion of the classifier. Grit that settles out in the chamber is moved by the rakes to the grit sump and this grit is carried upward in the classifier trough and removed after washing by means of water sprays 26 disposed longitudinally above the upper portion of the trough.

A flow meter 27 is disposed in the discharge pipe into which the outflow launder empties. It comprises a propeller 28 mounted rigidly on the end of a shaft 29 of a D.C. generator 30. The output leads 31, 32 of this generator are connected to a conventional spring-loaded electromagnetic solenoid 33 which is connected in turn to an adjusting lever 34 of the variable speed drive.

The settlement basin is constructed large enough to settle all the grit larger than a certain size, say 65 mesh, when the sewage flow is maximum. When this flow is maximum the rake is turned very slowly so as not to create a substantial turbulence in the pool in the settlement chamber. Under these conditions substantially nothing but grit settles in the chamber and this is moved to the classifier by the rakes. As the sewage flow diminishes the depth of the pool tends to decrease, as does the velocity of the sewage flowing through the pool, while the residence time of sewage in the pool increases. Under these conditions, suspended organic solids tend to settle with the grit. This tendency is overcome automatically, for the apparatus speeds up the rakes as the flow rate is reduced, thereby inducing a condition of turbulence in the pool such that organic solids are inhibited from settling. Moreover, as rake speed is increased, the rakes become less efficient in moving the organic solids which come in contact with them, so that these tend to be left behind. In consequence the grit delivered to the classifier is cleaner than heretofore and requires but little washing to render it suitable for discharge.

The apparatus of FIG. 2 is similar to that of FIG. 1, like parts being designated by like reference characters. However, instead of employing a meter on the outflow to vary the raking speeds, the apparatus of FIG. 2 has a float 35 disposed in a Parschall weir 36 in the flow launder. This float is attached to one end of a lever 37 mounted on a pivot or fulcrum 38 and the other end of the lever adjusts a variable resistance in a conventional rheostat 39. This rheostat is connected in a circuit 40 with a variable speed motor 41 provided with a built-in speed reducer, not shown. Through the speed reducer the motor is connected to the raking means. As the flow rate of the apparatus of FIG. 2 decreases, the float adjusts the rheostat to increase the speed of the rakes, thereby increasing the turbulence of the pool adjacent the submerged rakes. This interferes with the settlement of suspended organic solids.

The apparatus of FIG. 3 is also like that of FIG. 1, like parts being designated by like reference characters. However, no meter is employed on the outflow or inflow of the settlement basin. Instead a sensing means 45 is disposed in the basin itself. This sensing means comprises a tube 46 which projects downwardly into the pool in the settlement basin and is open at its submerged end 47. A constant volume air pump 48 supplies a continual stream of air to the tube and the pool. As long as the liquid level in the pool remains constant, the pressure in the tube remains constant. But if the level rises, as it does when flow through the pool is increased, the pressure in the tube rises. Conversely, if the flow through the pool decreases the pressure in the tube decreases. The change in pressure in the tube is sensed by a pressure pickup 49 connected to the tube through a branch 50. The pressure pickup may be of any suitable type, say that shown in U.S. Patent No. 2,636,964, granted April 28, 1953. The electrical output of the pressure pickup is connected to a servo amplifier 51 which controls a variable speed motor 52. As the flow rate of sewage in the apparatus of FIG. 3 decreases, the pickup senses the amount of the decrease and operates to increase the speed of the motor and the rakes which it drives. This increases the turbulence of the pool adjacent the submerged rakes and interferes with the settlement of light organic solids that otherwise would settle and contaminate the grit.

Speed regulating means for the apparatus of FIGS. 1, 2 and 3 should be so constructed that they do not tend to "over-regulate," in other words, to be excessively sensitive to minor changes in flow rate. Generally speaking, they should be so constructed that an adjustment in raking speed does not occur for less than a 5% variation in flow rate.

Rake speeds will depend upon the nature of the particular sewage to be treated, and some adjustment in the relationship between rake speed and flow rate may be expected. However, the following table shows the relationship between rake speeds and flow rates for three sizes of square settlement basins operating on municipal sewage. Thus, minimum rake speed for maximum flow rates and maximum rake speeds for minimum flow rates are given. In between these limits, a straight line correlation is satisfactory.

| | | | |
|---|---|---|---|
| Tank width—feet | 10 | 20 | 40 |
| Tank depth—feet | 3¾ | 4 | 5 |
| Maximum flow, millions of gals/day | 4 | 16 | 64 |
| Minimum flow, millions of gals/day | 1.5 | 6 | 24 |
| Pounds 65 mesh grit/day | 2,860 | 11,430 | 45,700 |
| Pool depth, maximum—feet | 1.6 | 2.1 | 3.6 |
| Pool depth, minimum—feet | 1 | 1.2 | 1.3 |
| Maximum rake speed—r.p.m. (for min. flow) | 0.9 | 0.75 | 0.5 |
| Minimum rake speed—r.p.m. (for max. flow) | 0.2 | 0.12 | 0.12 |

The practice of the invention has the following advantages:

(1) A cleaner grit product (less than 2% organic material);
(2) Elimination of septic conditions and odor problems in the classifier and in the grit;
(3) Improved efficiency of the classifier due to the fact that the grit delivered to it is cleaner to start with;
(4) Uniform cleanliness of grit product and uniform degritting of sewage irrespective of variations in flow rate.

I claim:

1. Apparatus for removing grit from a stream of sewage which varies in flow rate with time and which also contains suspended organic matter, the apparatus comprising a settlement chamber, a first conduit which discharges the sewage into the chamber, a second conduit which receives the sewage from the chamber so sewage flows through the chamber at a variable rate and depth, a grit discharge conduit in the bottom of the chamber, raking means at the chamber bottom for raking settled grit along the bottom and into the grit discharge conduit, a driving means for rotating the raking means about an upright axis at a variable speed to rake grit along the chamber bottom, means for sensing the rate of sewage flow through the settlement chamber, and automatic means responsive to the flow rate sensing means for increasing the speed of the raking means as the flow rate of the sewage through the chamber decreases to agitate the sewage and reduce settling of organic matter, and for decreasing that speed as flow rate of the sewage through that chamber increases.

2. Apparatus according to claim 1 in which the flow-sensing means is responsive to the level of the sewage in the chamber.

3. Apparatus according to claim 1 in which the flow-sensing means is responsive to the pressure of the sewage in the chamber.

4. Apparatus for removing grit from a stream of sewage which varies in flow rate with time and which also contains suspended organic matter, the apparatus comprising a settlement chamber, a first conduit which discharges the sewage into the chamber, a second conduit which receives the sewage from the chamber so sewage flows through the chamber at a variable rate and depth, a grit discharge conduit in the bottom of the chamber, raking means rotatable about an upright axis and located at the chamber bottom for raking settled grit along the bottom and into the grit discharge conduit, a variable-speed motor attached to the raking means to move the raking means at a variable speed and rake grit along the chamber bottom, means for sensing the rate of sewage flow through the settlement chamber, and automatic means responsive to the flow rate sensing means for increasing the speed of the motor as the flow rate of the sewage through the chamber decreases to agitate the sewage and reduce settling of organic matter, and for decreasing the speed of the motor as flow rate of the sewage through that chamber increases.

5. Apparatus for removing grit from a stream of sewage which varies in flow rate with time and which also contains suspended organic matter, the apparatus comprising a settlement chamber, a first conduit which discharges the sewage into the chamber, a second conduit which receives the sewage from the chamber so sewage flows through the chamber at a variable rate and depth, a grit discharge conduit in the bottom of the chamber, raking means rotatable about an upright axis and located at the chamber bottom for raking settled grit along the bottom and into the grit discharge conduit, a motor for driving the raking means, variable speed reducer connected between the motor and the raking means, means for sensing the rate of sewage flow through the settlement chamber, and automatic means responsive to the flow rate sensing means connected to the speed reducer for increasing the speed of the raking means as the flow rate of the sewage through the chamber decreases to agitate the sewage and reduce settling of organic matter, and for decreasing that speed as flow rate of the sewage through that chamber increases.

References Cited in the file of this patent

UNITED STATES PATENTS

| | | |
|---|---|---|
| 973,697 | Potts | Oct. 25, 1910 |
| 1,452,335 | Ball | Apr. 17, 1923 |
| 1,969,022 | Laughlin | Aug. 7, 1934 |
| 2,464,617 | Sebald | Mar. 15, 1949 |
| 2,678,912 | Kalinske | May 18, 1954 |
| 2,732,947 | White | Jan. 31, 1956 |

FOREIGN PATENTS

| | | |
|---|---|---|
| 457,618 | Canada | June 28, 1949 |